Figure 1:
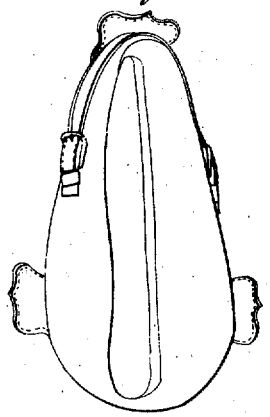
Figure 2:
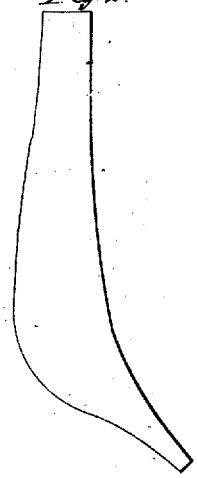
Figure 3:
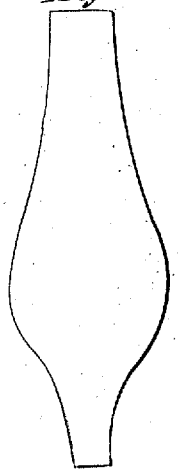
Figure 4:
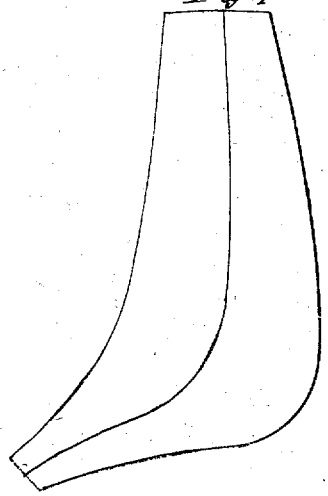

9236X

H. C. Call,

Cutting Horse-Collars,

Patented Nov. 14, 1835.

Nov. 14, 1835

Henry C. Call, of Sterling, Connecticut

Letters Patent.

The schedule referred to in these Letters Patent and making
part of the same, containing a description in the words of the said
Henry C. Call, himself of his improvement in the mode of cutting
and making Horse collars —
To All persons to whom these presents shall come
Henry C. Call, of Sterling in the county of Windham and State of
Connecticut, Mechanic sends Greeting —— Be it known that
I the said Henry C. Call, have invented, constructed, made
and applied to use, a new and useful improvement in the
mode of making & manufacturing Horse collars, called "Henry C.
Calls improvement in the manufacture of Horse collars" specified
in the words following to wit, This improvement consists in cut-
-ting the whole pad of the collar in one piece thus saving all
necessity of any seam, welt or stitching upon that part of the
collar, which has heretofore been practised and supposed to be
necessary. The shape and form of the collar when finished
is made the same as the most approved in present use, consis-
-ting of the following parts viz. The pad being the under
part of the collar resting against the breast of the horse and
upon which the hames are drawn, The roll being the upper
part of the Collar rising above the hames, The cap and the
[illegible] straps, The three last of which are constructed & made
as the same are now made, and no improvement in these parts is claimed —
But the improvement consists in the process of cutting whole
and making without seam or welt the pad of the collar —
Mode of cutting — prepare the pattern according to the size of the Collar
designed to be made. the pattern hereunto annexed, being
for the usual or common size, then by the pattern, cut the, 186. 9236X leather for the pad in one whole and entire piece and by passing the pattern to the next cutting it may be done the same side up without that waste or loss of leather which was always incurred in the old method of cutting, When cut, then the leather is to be made soft and pliable by wetting and crimped upon such form as the manufacturer may select. (to his own fancy) in any common crimping machine, when this is done the pad may be trimmed fitted to the Roll and stiched together at once stiching, when the pad and Roll are connected, the whole is then to be stuffed in the usual mode and the collar is done. The improvement thus made saves to the labourer more than half the work and leaves the collar smooth and free from all liability to rip or wear out at the sides where the seams have formerly been made.

In testimony that the above is a true specification of my said improvement as above described I have here to set my hand this 10th day of September 1835.

Witnesses
Andrew V. Judson
John Jones

Henry C. Call

Patented November 14 1835

Exd
W.C (516 words)

(Drawing)